United States Patent [19]

Emter

[11] Patent Number: 5,295,418
[45] Date of Patent: Mar. 22, 1994

[54] INDEXING SYSTEM FOR A SAW REGRINDING MACHINE

[76] Inventor: James Emter, 2007 NW. 267th Cir., Ridgefield, Wash. 98642

[21] Appl. No.: 924,858

[22] Filed: Aug. 4, 1992

[51] Int. Cl.⁵ ............................................. B23D 63/14
[52] U.S. Cl. ............................................. 76/37; 76/79
[58] Field of Search ................... 76/37, 39, 40, 44, 42, 76/43, 75, 77, 78.1, 79

[56] References Cited

U.S. PATENT DOCUMENTS

| | | | |
|---|---|---|---|
| 4,677,882 | 7/1987 | Beck et al. | 76/37 |
| 4,750,387 | 6/1988 | Swiger | 76/37 |
| 4,823,649 | 4/1989 | Emter | 76/41 |
| 4,901,604 | 2/1990 | Emter | 76/41 |
| 5,038,639 | 8/1991 | Emter | 76/75 |
| 5,088,358 | 2/1992 | Emter | 76/75 |
| 5,101,690 | 4/1992 | Emter | 76/75 |

Primary Examiner—Roscoe V. Parker
Attorney, Agent, or Firm—Chernoff, Vilhauer, McClung & Stenzel

[57] ABSTRACT

An indexing system for a saw regrinding machine includes a rotary shaft on which a circular saw is mounted and an index stop assembly which stops rotation of the blade to position the teeth thereof for a regrinding operation. The stop includes an index finger interposed into the path of the blade by an air cylinder which is controlled by a timing cam. The air cylinder includes an output piston that pushes a counterweight causing it to rotate about a pin. A finger member is attached to the counterweight and at appropriate times rotates about the pin to intercept a particular saw tooth in a position to permit it to be sharpened by a grinding wheel.

9 Claims, 4 Drawing Sheets

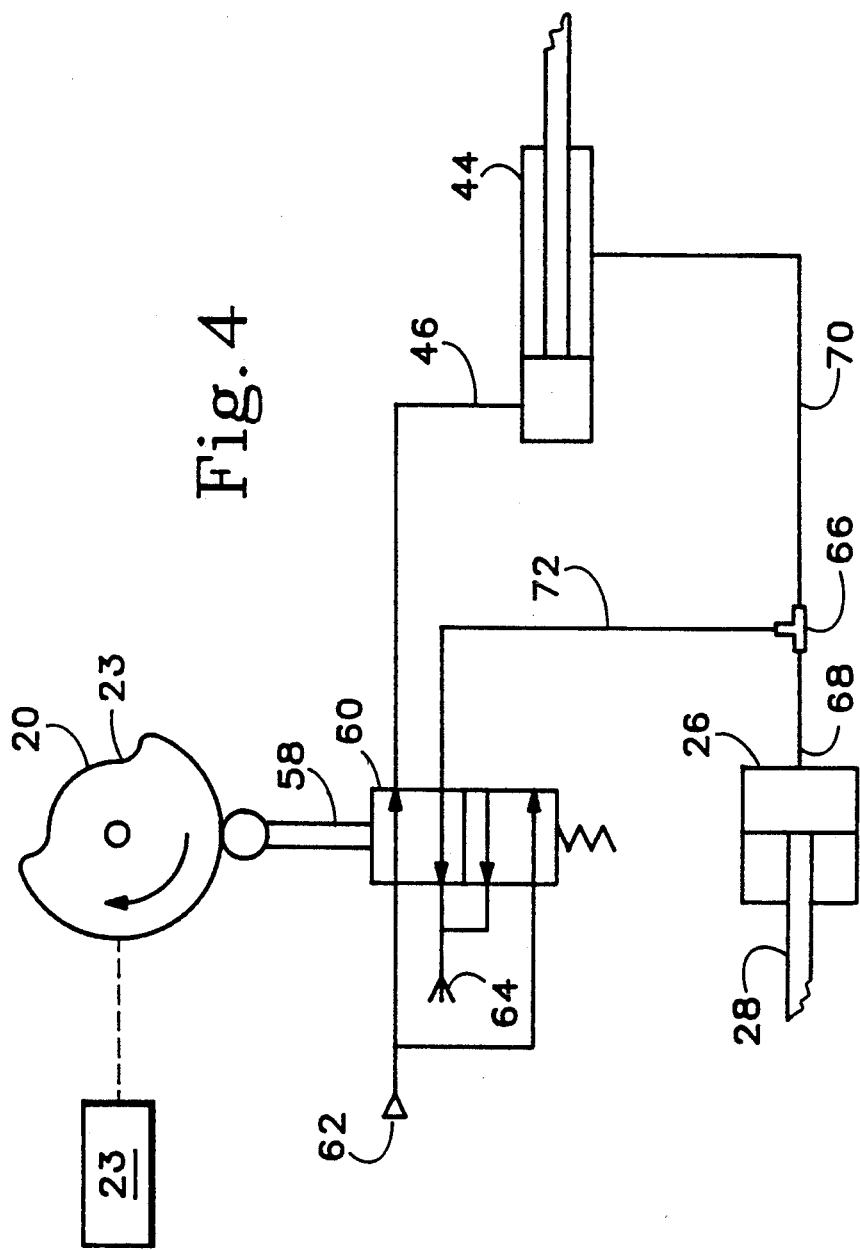

INDEXING SYSTEM FOR A SAW REGRINDING MACHINE

BACKGROUND OF THE INVENTION

Saw regrinding machines such as top and face grinders are used for sharpening the teeth of circular saw blades. Typically such machines rotate a saw blade in increments stopping each tooth of the blade at a position where a grinding wheel may grind the appropriate surface of the tooth. An automatic saw sharpener of this type requires very precise positioning for the grinding wheel to execute a grinding stroke. Typically there is an indexing mechanism which includes a finger interposed into the path of the blade to intercept each tooth at a particular location in space as the blade is rotated after each sharpening stroke. An example of a saw blade top and face grinder which includes an indexing apparatus of this type is shown in my U.S. Pat. No. 5,038,639 entitled SAW BLADE TOP AND FACE GRINDER issued Aug. 13, 1991.

The aforementioned patent, the text of which is incorporated herein by reference, illustrates a top and face grinding machine that includes an indexing apparatus which imposes a stop into the path of the teeth of the saw blade from a position which is laterally displaced from the plane of the saw blade. The saw blade is rotated incrementally in a clockwise direction to advance the next tooth to be ground, and then counterrotated in a counterclockwise direction to precisely position the tooth. It is during the counterclockwise rotation that the index finger is interposed into the path of the plane of the saw blade to intercept the particular tooth that is to be sharpened. Once the finger stops the counterrotating saw blade at the correct position for sharpening, a side clamping mechanism is engaged which holds the saw blade in a stationary position for the grinding stroke. At this point the index finger is moved out of the way.

The indexing mechanism of the aforementioned '639 patent suffers, however, from several drawbacks. It is a relatively complicated mechanism, both in the manner of its operation, and in the expense associated with the number of parts that must be machined and assembled.

A desirable objective would be to provide an indexing stop that could be interposed into the plane of the blade from a lateral position, but without the attendant complexity and fabrication expense of the aforementioned system.

Another problem that is common to contemporary automatic saw regrinding machines is the necessity for coordinating the various mechanical operations that must take place to advance the saw blade and regrind each tooth in turn. Pneumatic systems in particular are problematical because typically such systems include a multiplicity of air cylinders, each having its own pneumatic source which must be controlled by multiple valving arrangements actuated at the appropriate times. Such systems are complex and are prone to numerous adjustment problems.

SUMMARY OF THE PRESENT INVENTION

The present invention provides an indexing stop mechanism and a simplified system for sequencing the indexing stop in conjunction with the other components of an alternative saw regrinder. The saw regrinding system of the present invention includes a rotary spindle for rotating the saw to position each tooth thereof in turn for sharpening, and a pneumatic source feeding both a side clamp assembly and a stop assembly. The side clamp assembly is responsive to the pneumatic source for engaging the saw to prevent its movement during sharpening. A stop assembly is provided for halting rotation of the blade at a predetermined position wherein the stop assembly includes an indexing finger which is responsive to a single action air cylinder for interposing the indexing finger into the plane of the blade. A bias spring retracts the finger from the path of the saw blade when the side clamp assembly engages the saw blade.

The stop assembly includes an indexing stop mounted for rotation about an axis that is substantially parallel to the plane of the circular saw blade but displaced therefrom. The stop includes a finger portion which is inclined at an angle toward the plane of the circular saw blade. A piston acting against this stop causes it to rotate about its axis and intercept a tooth of the circular saw blade at the appropriate time.

The piston is driven by a single action air cylinder connected to the aforementioned pneumatic source through a valve. The stop assembly includes a counterweight abutting the piston and a bias spring for holding the counter weight in abutting relationship against the piston. Since the air cylinder is a single action air cylinder, when pressure is removed from the air cylinder the bias spring automatically pulls the finger out of the plane of the saw blade in readiness for capturing the next tooth to be sharpened. Both the stop assembly and the side clamp assembly are controlled by a valve which is in turn controlled by a timing cam which also controls the stroke of the grinding wheel. In this way the sequencing of the various mechanical operations of positioning and grinding the saw teeth is carried out in an efficient manner with a minimum number of moving parts.

It is a primary object of this invention to provide a simplified laterally positioned stop assembly for use with a circular saw regrinding machine.

Yet a further object of this invention is to provide a stop assembly that is simple to operate and to fabricate and which may be controlled by a single valve pneumatic system.

BRIEF DESCRIPTION OF THE DRAWINGS

FIG. 4 is a schematic diagram of the timing cam operating in conjunction with the pneumatic components of the saw regrinding machine.

DETAILED DESCRIPTION OF THE PREFERRED EMBODIMENT

Figure 3:
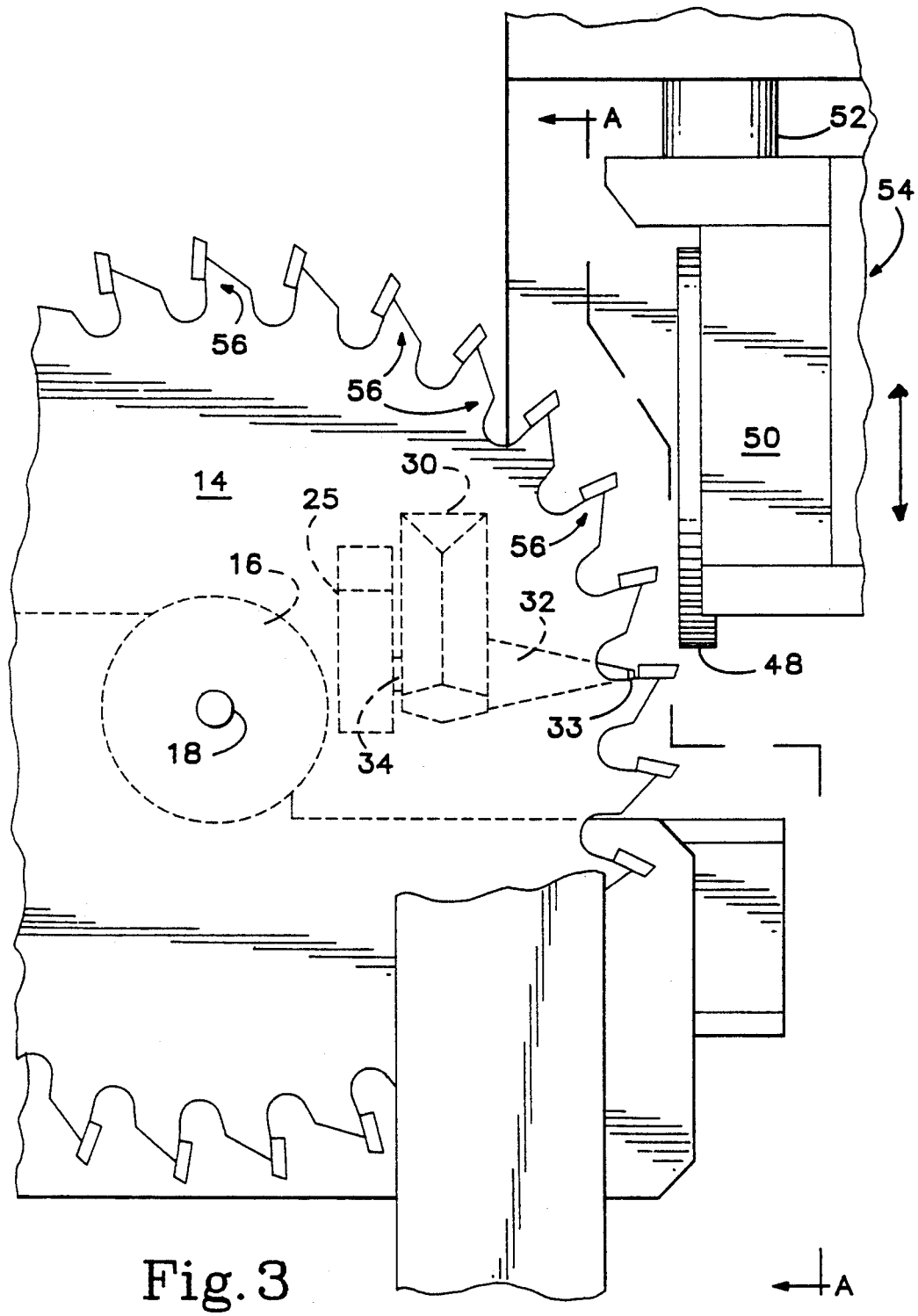
FIG. 3 is a partial cutaway side elevation view of the regrinding machine taken along line A—A of FIG. 1.

A saw regrinder machine 10 includes a frame 12, a stop assembly 24, and a grinding assembly 54 (best seen in FIG. 3). The grinding assembly 54 moves a grinding wheel 48 reciprocally (as indicated by the arrow in FIG. 3) along a grinding stroke axis to grind the face portions of the teeth of a circular saw blade 14. Referring again to FIG. 3, the grinding assembly 54 includes a grinding wheel 48 secured and enclosed by a grinding wheel frame 50 suspended by a bearing 52 which also allows partial rotary movement about an axis of the bearing. This allows the faces of the teeth of the saw blade to be ground at slight angles, as is conventional, which alternate in a side-to-side fashion from one tooth to the next. When a saw tooth 56 is in position and ready for sharpening, the grinding wheel assembly 54 is driven by a rocker arm (not shown) connected to the timing cam 20 (refer to FIG. 4) in a downward direction along its grinding stroke axis. After the sharpening stroke, the face of the tooth 56 has been ground and the grinding wheel assembly 54 moves upwardly out of the path of travel of the saw teeth 56 such that the saw blade 14 can be rotated in preparation for the sharpening of the next tooth.

The saw blade 14 is magnetically secured to a magnetic slip clutch assembly 16 on a drive shaft 18 that rotates just enough to advance a tooth into a grinding position and is then counter-rotated to reset. The drive shaft 18 is driven by a mechanical link (not shown) connected to a lever 13 mounted on a passive rotary shaft 15. The lever 13 is coupled to a rod linkage 17 that drives the shaft 18 With a back and forth motion.

Figure 1:
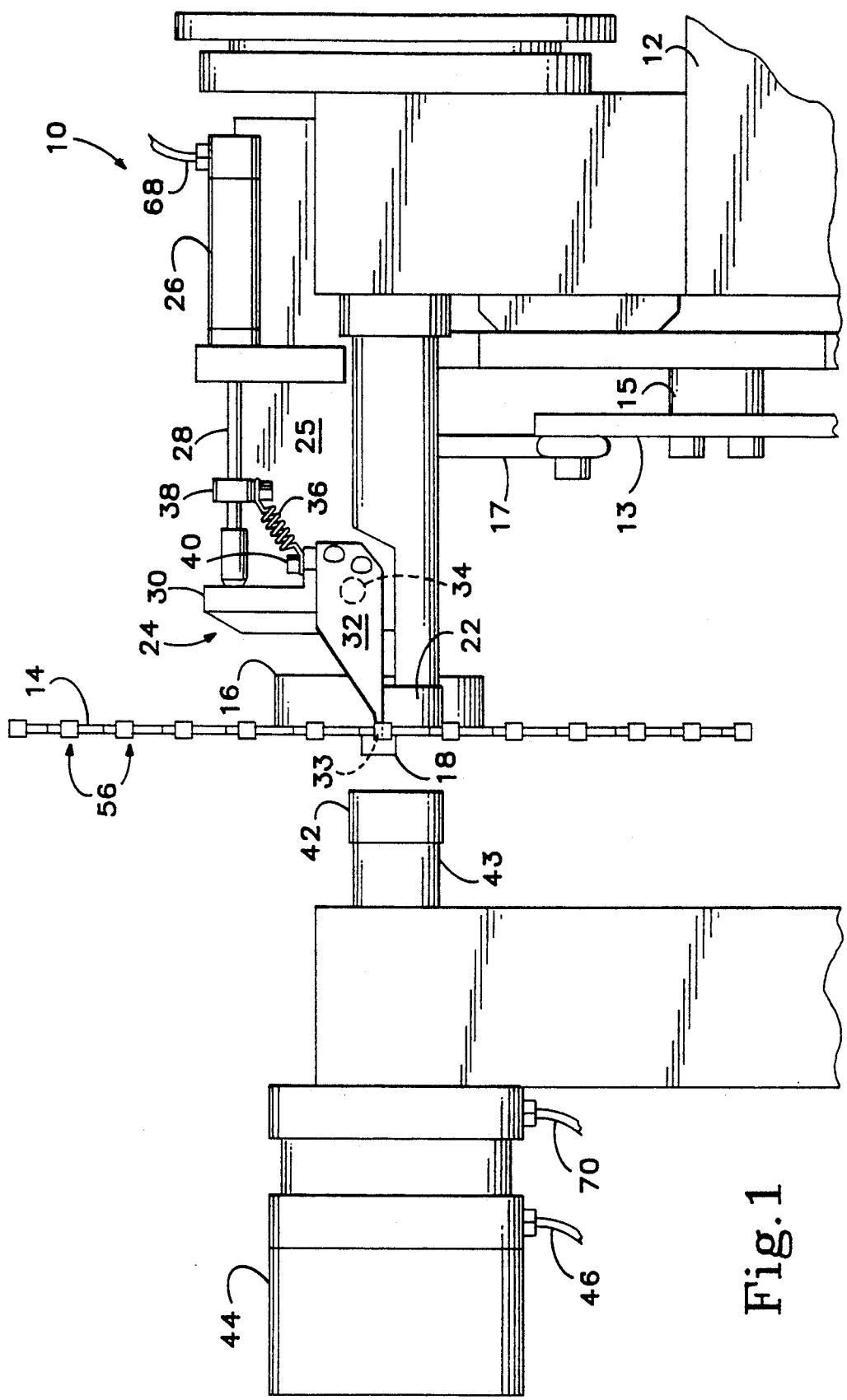
FIG. 1 is a partial side elevation view of the saw regrinding machine of the present invention.
Figure 2:
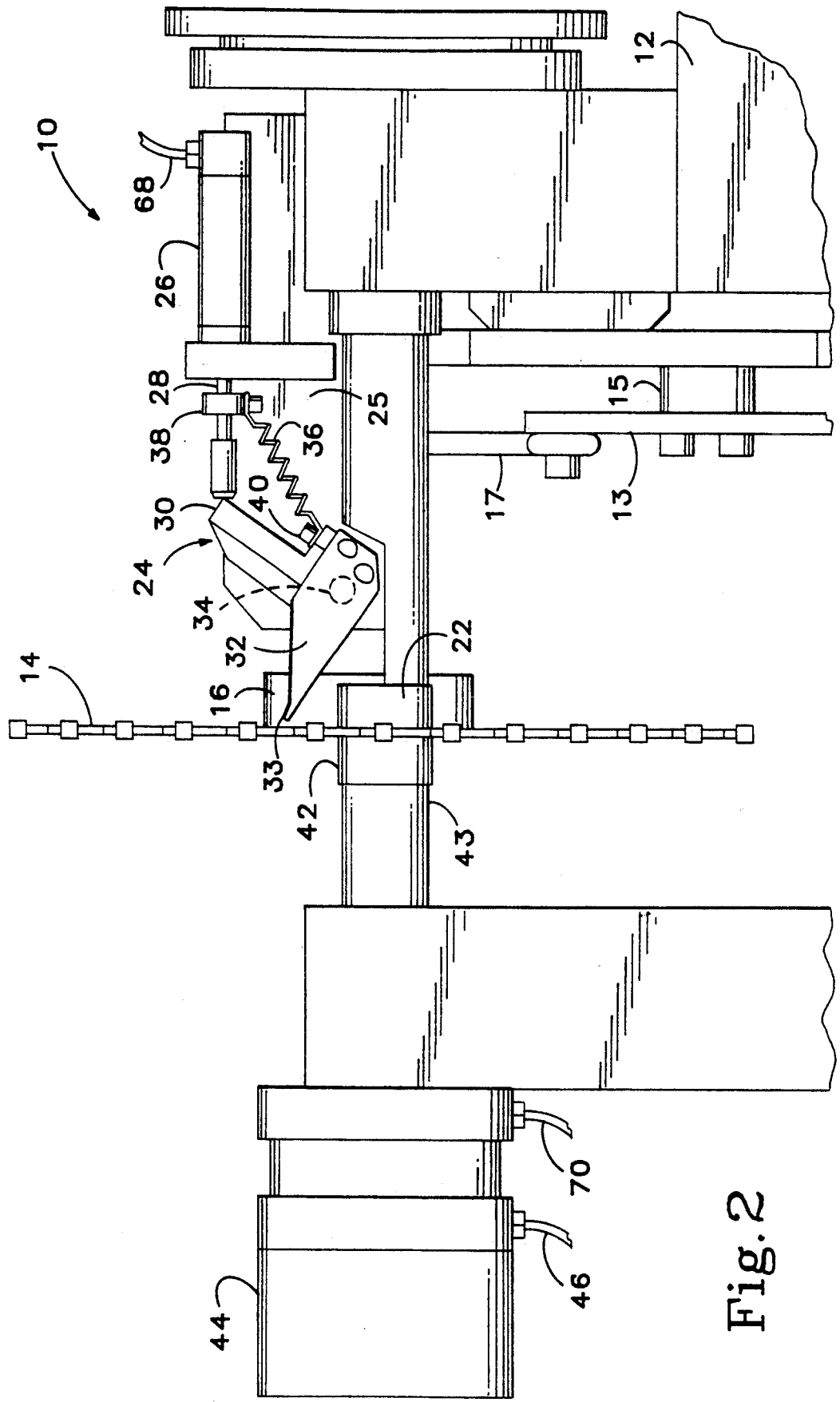
FIG. 2 is a partial side elevation view of the saw regrinding machine of FIG. 1 shown at a different point in the regrinding process.

In conjunction with the rotation of the blade, the stop assembly 24 operates to interpose an obstruction in the form of an indexing finger 32 in the path of the blade at the next tooth 56 to be ground. The index finger 32 is fastened to a counterweight 30. A stop assembly frame 25 includes a freely rotatable mounting pin 34 extending substantially parallel to the blade. Both the counterweight 30 and the finger 32 are journaled onto the pin 34. The index finger 32 is maneuvered by operation of a single action pneumatic cylinder 26 which drives a valve piston 28. As the lever arm 13 rotates to advance the saw blade 14, a cam 20 (refer to FIG. 4) causes the pneumatic cylinder to expand by allowing air to enter via an air supply hose 68 thus extending the valve piston 28. The valve piston thus causes the counterweight 30 to rotate about the pin 34 toward the saw blade 14. The index finger 32, which includes a tip 33 bent so that it extends perpendicular to the blade, is rotated with the counterweight 30 and is pushed into the plane of travel of the teeth 56 of the saw blade 14 to obstruct counter-rotation of the blade by catching a tooth in the scalloped area radially inward from the tooth face. At this point the slip clutch 16 allows the drive shaft 18 to counterrotate to its reset position while the blade itself is held stationary by the tip 33 of the finger 32. Once the index finger 32 has stopped the saw blade's rotation, the side clamp 42, driven by the side clamp cylinder 44, extends outward along the stroke axis of the piston 43 into frictional engagement with the saw blade 14 clamping it against a passive guide member 22. The result is that the saw blade 14 is pinched between the side clamp piston 43 and the saw blade guide member 22, thus ensuring that there is no movement of the saw blade during regrinding. The side clamp cylinder 44 is a double acting air cylinder driven by air supplied by the air supply hoses 46 and 70 emanating from a pneumatic source 62 as shown in the schematic diagram in FIG. 4. FIG. 2 shows the side clamp 42 in its fully extended position, and FIG. 1 shows the side clamp 42 in its retracted position.

Referring to FIG. 2, once the side clamp 42 is fully extended and the saw blade 14 is secured, the index finger 32 is removed from the path of the blade. This is done by releasing pressure in the pneumatic cylinder 26. Once this occurs the counterweight 30 and index finger 32 are retracted by the motion of a bias spring 36 which is connected between the valve piston 28 and the index finger 32. One end of the bias spring 36 is fixed to the index finger 32 by a nut 40 while the other end is fixed to the valve piston 28 by a clamp 38. When pulled by the spring 36 the finger rotates just enough for the tip 33 to clear plane of the blade. At this point, the grinding assembly 54 commences to grind the face of the saw tooth which is now clamped in proper position.

The entire sequence discussed above is controlled by a timing cam 20 shown in FIG. 4 which has a cycle time that may be made slow enough to accommodate the largest expected gap between saw teeth.

Referring to FIG. 4 a motor 23 drives the rotary timing cam 20 which includes a cutout portion 23. The rotary cam 20 is constructed and operates essentially as described with reference to FIGS. 7, 7a and 7b of the aforementioned U.S. Pat. No. 4,038,639. As such the cam includes a race with an inserted cam follower connected to a rocker arm which reciprocally drives the grinding wheel assembly with an up and down motion (not shown). A cam follower 58 rides along the outside edge of the cam 20 and is connected to a valve 60. The valve 60 is coupled, in turn, to a source of pneumatic pressure 62 and a pressure outlet orifice 64. The valve 60 is connected to the side clamp cylinder 44 by way of an input line 46. The pneumatic cylinder 26 which operates the valve piston 28 is connected to a T connector 66. An output line 68 runs from the T connected 66 to the pneumatic cylinder 26. A similar output line 70 couples the T connector 66 to the retraction side of the side clamp cylinder 44. The input to the T connector 66 is a pneumatic line 72.

In actual operation the cam follower 58 depresses the valve 60 against its internal bias spring when it rides along the outermost portion of the cam 20. This provides air pressure to the back side of the air cylinder 44, activating the side clamp 42 and holding the saw blade in a stationary position for regrinding. When the cam follower 58 enters the cutout portion 23 of the rotary cam 20, the valve 60 connects pneumatic pressure to line 72 while allowing the pressure on line 46 to exhaust. The line 72 energizes both the retract side of the air cylinder 44 via line 70 and the air cylinder 26 via line 68 since both are coupled to the T connector 66. This provides an inherent simplicity in the timing of three important operations in the regrinding sequence. First, the cam 20 controls the grinding stroke as described in the aforementioned U.S. Pat. No. 5,038,639. Second, a single source of pneumatic pressure 64 controls both the double acting side clamp cylinder 44 and the single action air cylinder 26 which is the index stop actuator. When the side clamp assembly is released, the stop assembly is automatically engaged interposing the index finger into the path of the saw blade. Conversely, when pressure is removed from the stop index assembly and its associated air cylinder 26, pressure is also removed from line 70 and the double acting air cylinder 44 is pressurized once again to engage the side clamp.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a saw regrinder for sharpening the teeth of a circular saw including a rotary spindle having the saw mounted thereon for rotating the saw to position each tooth thereof in turn for sharpening, an indexing system comprising:
   (a) a pneumatic source;
   (b) a side clamp assembly responsive to the pneumatic source for engaging the saw to prevent its movement during sharpening; and
   (c) a stop assembly comprising a single action air cylinder responsive to the pneumatic source for halting rotation of the saw at predetermined positions by pushing an indexing finger into the plane of the saw, said stop assembly having retracting spring means for retracting the finger away from the plane of the saw blade when the side clamp assembly engages the saw.

2. The indexing system of claim 1 wherein the stop assembly further includes a counterweight abutting a piston driven by said air cylinder.

3. In a saw regrinding machine for sharpening the teeth of a circular saw blade, a stop assembly for halting the rotation of the saw blade comprising a stop mounted for rotation about an axis substantially parallel to the plane of the circular saw blade, said stop having a finger portion inclined at an angle towards the plane of the circular saw blade and means for causing the stop to rotate about its axis and intercept a tooth of the circular saw blade.

4. The stop assembly of claim 1 wherein the means for causing the stop to rotate is a piston driven by an air cylinder.

5. The stop assembly of claim 1 wherein the stop includes a counterweight abutting the piston.

6. The stop assembly of claim 5, further including a bias spring for holding the counterweight in abutting relationship against the piston.

7. In a machine for sharpening a circular saw blade including blade advancing means for rotating the saw blade about an axis, a stop assembly for halting rotation of the saw blade to permit the sharpening of individual teeth thereof comprising a finger laterally displaced from the saw blade and affixed to a member mounted for rotation about an axis substantially parallel to the saw blade and a piston bearing against the member to cause the finger to intercept a tooth of the saw blade.

8. The stop assembly of claim 7 wherein the finger is inclined towards the saw blade at an angle and includes a tip member bent to project perpendicular to the saw blade, wherein the tip member engages the saw blade in a scalloped portion thereof adjacent a tooth to be sharpened.

9. The stop assembly of claim 8, including a retracting spring for pulling the finger away from the scalloped portion.

* * * * *